United States Patent [19]

Kaenel

[11] 4,140,404
[45] Feb. 20, 1979

[54] PRINTER FOR BOWLING SCORE COMPUTER

[75] Inventor: Reginald A. Kaenel, Weston, Conn.

[73] Assignee: AMF Incorporated, White Plains, N.Y.

[21] Appl. No.: 725,885

[22] Filed: Sep. 23, 1976

[51] Int. Cl.² .......................... B41J 3/20; A63D 5/00
[52] U.S. Cl. .................................... 400/120; 400/121; 273/54 C
[58] Field of Search .............. 197/1 R; 235/61.12 R, 235/92; 273/54 C, 54 D; 340/172.5, 323; 400/124, 121, 123, 126, 120

[56] References Cited

U.S. PATENT DOCUMENTS

| | | | |
|---|---|---|---|
| 3,247,789 | 4/1966 | Webb et al. | 273/54 C |
| 3,272,123 | 9/1966 | Webb | 273/54 C X |
| 3,289,574 | 12/1966 | Webb | 101/93 C |
| 3,295,439 | 1/1967 | Miller et al. | 273/54 C X |
| 3,499,649 | 3/1970 | Mentzer et al. | 273/54 C |
| 3,649,014 | 3/1972 | Hoffman | 273/54 C |
| 3,931,761 | 1/1976 | Carrus et al. | 197/1 R X |

Primary Examiner—Paul T. Sewell
Attorney, Agent, or Firm—George W. Price; John H. Gallagher

[57] ABSTRACT

A dot printer compatible with a bowling scorer system is disclosed wherein game score data is stored for a plurality of bowlers; one character of such data for each bowler is converted to a dot matrix compatible format; and a columnar portion of each converted character is printed for each player, the print operation being repeated until the characters are all printed. The system is uniquely compatible with printing of a game score background grid, whereby certain dot printing elements are energized in printing every column to print the grid's horizontal lines; and all vertical dot elements are concurrently energized at designated intervals between character printings to print vertical lines.

31 Claims, 7 Drawing Figures

PRINTER FOR BOWLING SCORE COMPUTER

BACKGROUND OF THE INVENTION

Automatic bowling scorer systems that include score printing apparatus are known in the art. In some of these systems the printers print the game score data at the completion of each frame of the game. In some known boiling scorer printer systems of this type, the paper onto which the frame-by-frame and game total scores are printed already has printed thereon a bowling scoresheet grid pattern which defines the areas where the players' frame-by-frame and game total scores are to be located. Because of alignment problems that frequently occur between the print head and the preprinted paper, the frame and total scores are not always printed in the designated areas defined by the grid pattern. This problem is compounded by the fact that players do not always bowl in their assigned sequence, in which case the next score to be printed may be above or below and/or to the left or right of the last printed score. Therefore, typically, the printer portion of an automatic bowling scorer system is one of the more complicated and least reliable portions of that system.

Even in a known system where the game score data is printed out only after a game is completed, such as disclosed in Warner U.S. application Ser. No. 319,353 filed Dec. 29, 1972, the printed information is not in the usual bowling scoresheet format comprising a parallel line for each bowler, and the printout is not made against a pre-printed background grid.

SUMMARY OF THE INVENTION

It is the object of this invention to provide a bowling scorer printer capable of printing all game score data for a plurality of players in a very short time, on command, and without any alignment problem between print head and the scoresheet grid pattern. This and other beneficial objects are achieved by a printer having a linear array of dot print elements. Five successive energizations of the array of dot print elements are required to form each character on an advancing strip of blank paper. Predetermined ones of the dot elements are activated on each energization of the array to form respective characters. After each frame score has been printed, all dot print elements are activated to print the vertical lines of the bowling scoresheet grid pattern. Designated ones of the dot print elements are activated with each energization of the array to concurrently print the horizontal lines of the grid pattern. The dot print array is of sufficient height to print the game score data for all the players on the team substantially simultaneously, frame by frame, based on the game score data stored in the random-access memory of the bowling computer.

CROSS REFERENCE TO RELATED APPLICATIONS

For details of a typical scoring format by which a computer can determine game score data from stored ball score data, see Warner U.S. application Ser. No. 319,353 assigned to the assignee of this invention, the entire disclosure of which is incorporated hereby in reference.

DESCRIPTION OF A PREFERRED EMBODIMENT

Figure 1:
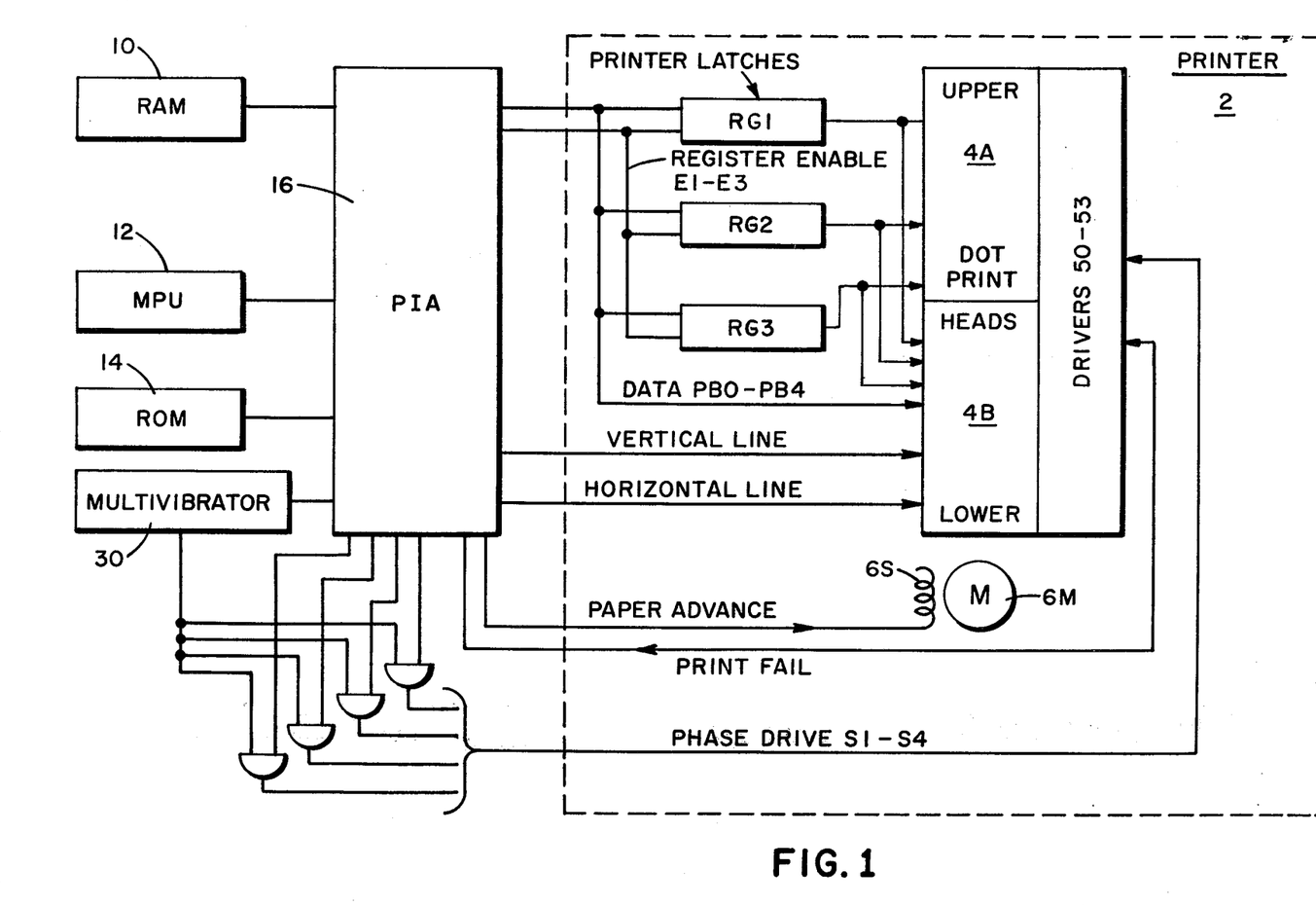
FIG. 1 is a block diagram of the printer and print control system.
Figure 2A:
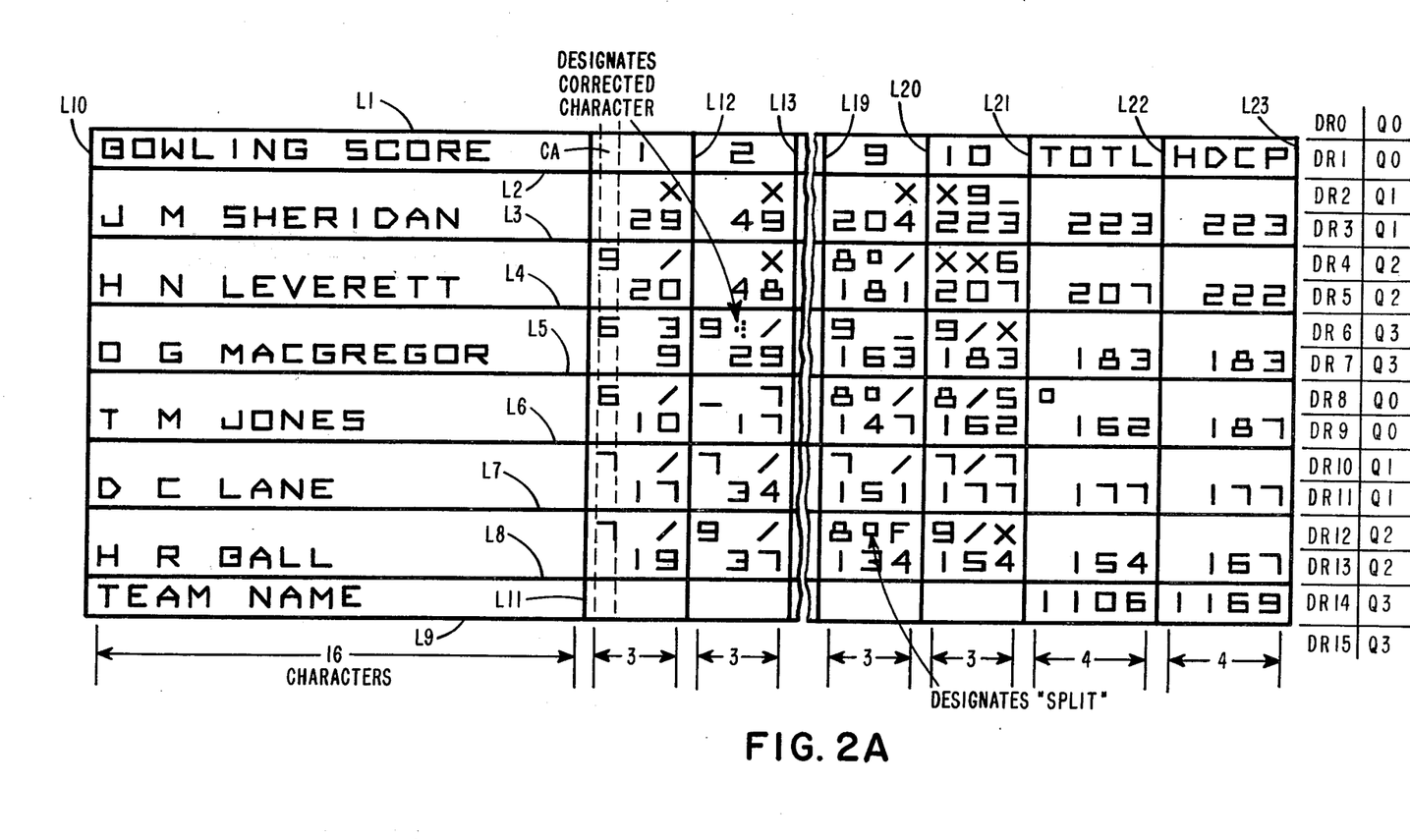
FIG. 2A is an exemplary score sheet printed by the printer of this invention.

A block diagram of the overall system is shown in FIG. 1, and an example of the resultant printed scoresheet is illustrated in FIG. 2A.

The printer 2 includes a printhead 4 and a stepping motor 6 for advancing a strip of thermally active paper past the printhead. The printhead 4 is comprised of two substantially identical printheads 4A and 4B mounted end to end. These individual printheads are of a design manufactured by Gulton Industries, Metuchen, N.J., the matrix used to selectively energize the dot print elements shall be fully disclosed herein. Each individual printhead assembly 4A, 4B has an arrangement of 67 dot print elements in a linear array so that the complete printhead assembly 4 has a linear dot array of 134 dot print elements. The dot print elements on the printhead 4 are individual thick firm resistor elements which heat up upon the passing of electrical current therethrough. The dot print element have a fast thermal cycle which permits them to heat and cool rapidly upon the application and termination of current flow therethrough. The surface of thermal printhead 4 is in contact with a strip of thermographic (heat active) paper and the heated print dot elements on the printhead 4 produce corresponding dots on the thermographic paper.

As shown in FIG. 2A, for purposes of printing data comprising the headings, game and frame information and totals, the total vertical space to be imprinted is divided into 16 rows DR0-DR15. The upper printhead assembly 4A prints the top two horizontal lines L1, L2 associated with the heading to be printed upon the scoresheet (see FIG. 2A), the three horizontal lines L3, L4, L5 defining the scoresheet grid for the first three players and all rows DR1-DR7 of character data lying between these lines; the lower head 4B prints the lines L6, L7 defining the grid for the three lower players, the lines L8, L9 associated with player total information and all rows DR8-DR14 of character data lying between lines DR8-DR14. Of course, all dot elements are energized to print the vertical lines L10-L23 of the background grid.

The thermal print heads are multiplexed, to minimize the number of signal lines that must be routed to them. The 16 rows DR10-DR15 are grouped into 4 quadrants, Q0, Q1, Q2, Q3 (see the right hand side of FIG. 2A). With 4 quadrants multiplexed it is no problem to maintain less than 25% duty cycle on each resistor dot element prolonging element life. This is true so long as all 4 quadrants are used for printing on each cycle, which is true in this system.

Referring to the printer layer sheet of FIG. 2A, the data print rows as numbered from DR1 through DR14 are divided for printing purposes into the following head/quadrant combinations:

| Row | Head | Quadrant |
| --- | --- | --- |
| DR0* | A | 0 |
| DR1 | A | 0 |
| DR2 | A | 1 |
| DR3 | A | 1 |

-continued

| Row | Head | Quadrant |
| --- | --- | --- |
| DR4 | A | 2 |
| DR5 | A | 2 |
| DR6 | A | 3 |
| DR7 | A | 3 |
| DR8 | B | 0 |
| DR9 | B | 0 |
| DR10 | B | 1 |
| DR11 | B | 1 |
| DR12 | B | 2 |
| DR13 | B | 2 |
| DR14 | B | 3 |
| DR15* | B | 3 |

Note that while FIG. 2A has only 14 printed rows of data DR1–DR14, 16 rows are provided for in the above table. Rows DR0 and DR15 (marked with asterisks) never have character data to be printed, but control signals are issued as if the two lines do exist; blank characters (no dots on) are issued to rows DR0 and DR15. This scheme is used merely to simplify the overall design by avoiding the special cases at each end of the dot element array.

The data to be printed is stored in the memory of the bowling score computer shown in the block diagram of FIG. 1. The computer includes a random-access memory 10 for storage of ball-by-ball, game and frame score data. Microprocessor MPU 12 performs data computation operations in accordance with a program stored in read-only memory ROM 14.

Peripheral interface adapter PIA 16 is the communications link between the microprocessor 12 and its associated devices, i.e., random-access memory 10; read-only memory 14 and printer system 2. The PIA 16 recognizes an address and gives the microprocessor 12 access to that address. In the preferred embodiment of this invention, the microprocessor 12 is a Motorola 6800, and PIA 16, which must of course, be compatible therewith, is a Motorola 6820.

The significant data outputs from the PIA 16 to the printer of this invention are the lines PB0–4 carrying the data which define each character to be printed in the rows DR0–DR14; printer storage register control signals E1–E3 for causing storage of the character defining data; phase drive signals S1 ∝ S4 for energizing the dot print elements selected by the developed data to print each character, or to print the lines of the background grid; the signal V.LINE for causing a vertical line print; the signal H.LINE for causing horizontal line print; and the signal PAPER ADVANCE for energizing the paper advance mechanism 6. Provision is also made for transmitting a PRINT FAIL from the print head 4 back to the PIA 16; in the event of a failure in the printer head 4, data transmission is thereby halted.

The timed relationship of all the signals mentioned above appears in the context of the following description of the overall invention.

Figure 2B:
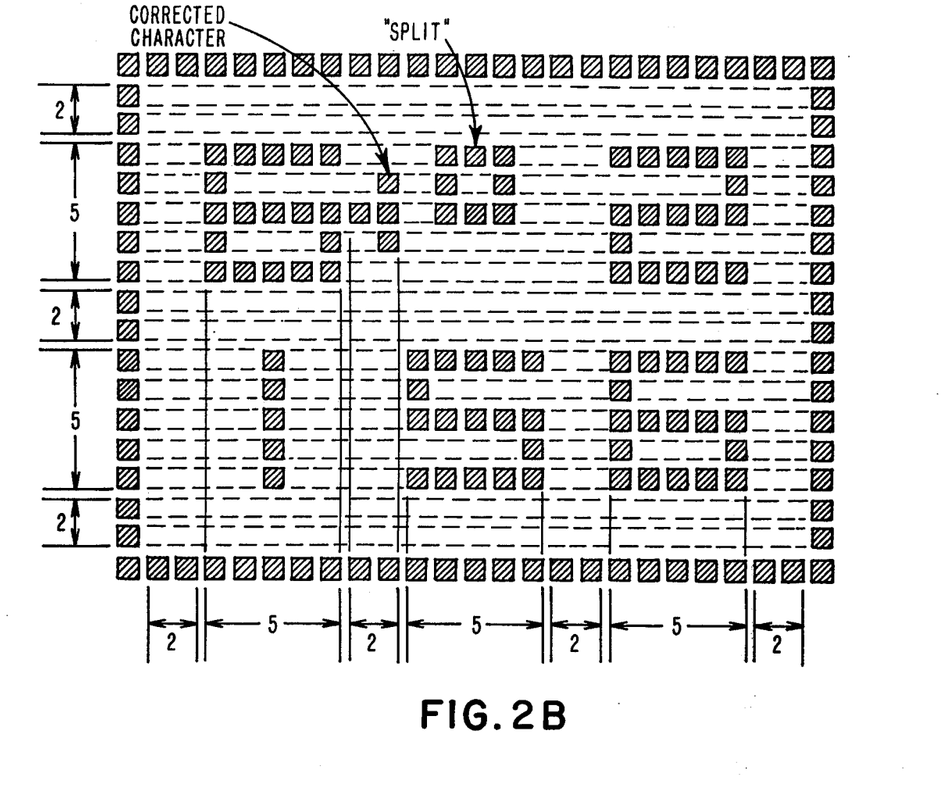
FIG. 2B is an exemplary frame score as printed by this invention.

As shown in FIG. 2B, each character in each row DR1–DR14 of the full printout shown in FIG. 2A is printed by defining it in terms of the significant dots in a 5-by-5-dot matrix. It has been explained above that 4 quadrants, each quadrant comprising 4 rows, must be printed to print the full height of the scoresheet; and as shown in FIG. 2B, 5 print cycles in the row direction are required to print a complete character. The control signals to be discussed below provide for this character printing sequence.

System timing requires only a simply counting routine for counting the width of a frame space, and the width of characters within the space, in accordance with the dot count sequence illustrated in FIGS. 2B.

This is accomplished using the following sequence, starting from the left side vertical column as shown in FIG. 2B:

1. print full vertical column;
2. print 2 columns of horizontal line dots;
3. transfer a character for each of the 14 rows DR1–DR14 to a buffer storage area in RAM 10;
4. look up the 5-by-5 dot format data as stored in ROM 14 for each stored character;
5. transfer on lines PB0–PB4 one column of dot format data for each of the character rows DR1–DR14 (rows DR0, DR15, no data is calculated or transmitted); data is transferred in the sequence DR1, DR8, DR9, DR2, DR3, DR10, DR11, DR4, DR5, DR12, DR13, DR6, DR7, DR14;
6. energize a register enable line E1–E3 to store the data presented on lines PB0–PB4 until printing; (only the first three rows of each quadrant are stored in registers RG1–RG3; the fourth row is applied directly to the print head on lines PB0–PB4;
7. after each 4 data row transfers, i.e., 1 quadrant, energize the one of driver strobes S1–S4 coincident with the rows of data transferred;
8. after the fourth quadrant is printed, pause for paper advance;
9. repeat steps 5–7 four times to print a full column of characters.

For example, to print column CA of FIG. 2A, to accomplish step 3, characters 9, 6, 6, 7, 7, would be stored in storage areas in RAM 10 allocated to print rows 4, 6, 8, 10, 12, respectively; no character would be stored for the other rows. The table lookup is performed for the stored characters, and a one of the five columns of dot character information is transmitted to the printer.

This fetch routine is simplified by storing the characters to be printed in columnar array relative to one another in memory. The characters of the character column are converted through a lookup table into a binary word whose bits correspond to the darkened dots on the next dot column. Of course, each character being represented by a 5-by-5 matrix, 5 columns of dot format data are required to print all the characters in a given column. After each selection of the characters to be printed in a column, e.g., column CA, in the course of printing the column, 5 lookups are performed of each character in the column to establish the 5 separate successive sets of dot column data representing vertical character segments that are necessary to print each character. A simple counting bit routine keeps track of which dot column within a given character column is being printed. This system uses 5 lookups to save storage space; this modification is available because of the relatively low horizontal speed of the printer. Table lookups for data conversion and display in dot format are well-known in the art, e.g., Koster et al U.S. Pat. No. 3,346,853 or Mau et al U.S. Pat. No. 3,868,673.

Figure 3A:
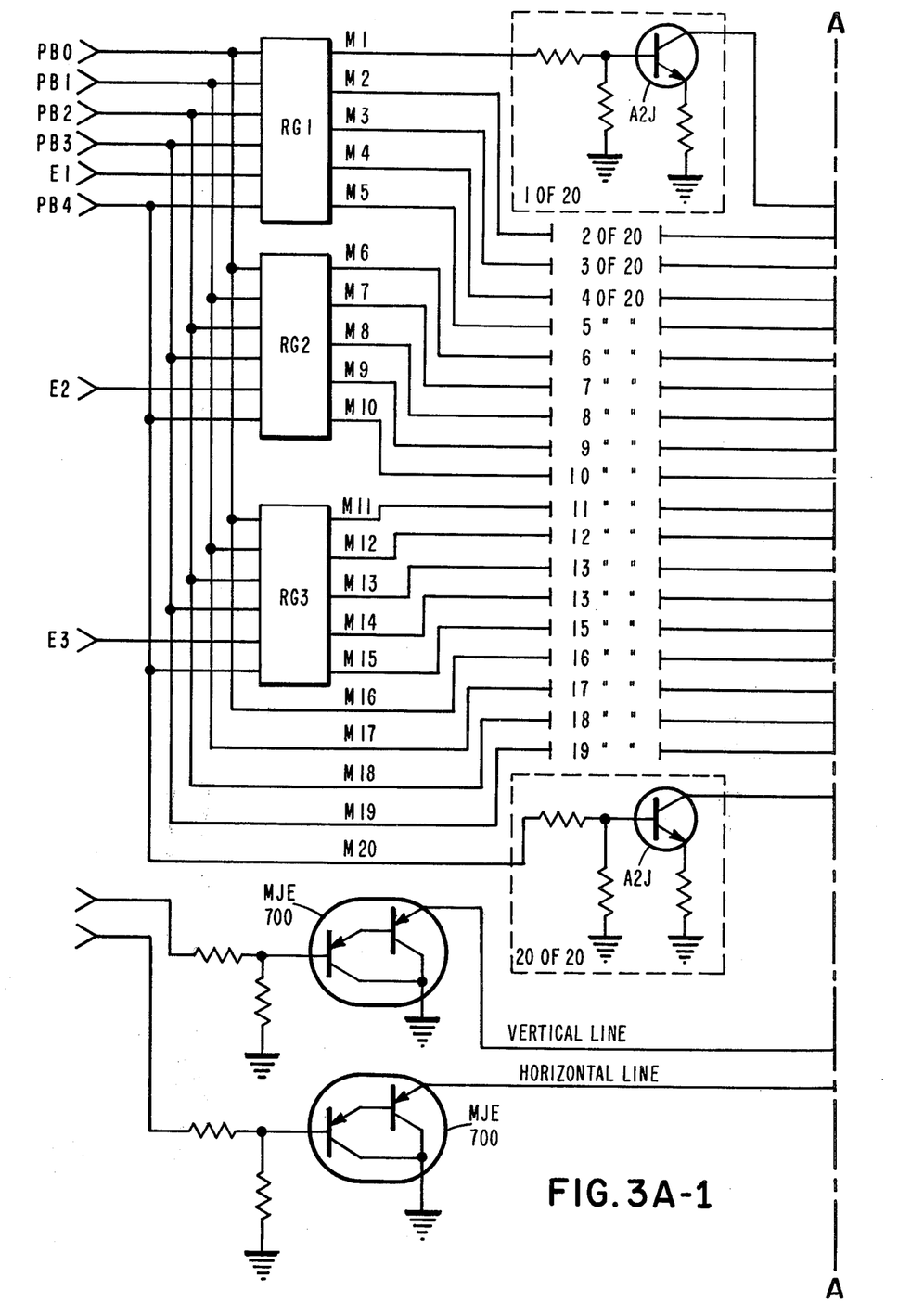
FIG. 3A is a detailed schematic of the means for transmitting control signals to the print head.
FIG. 3B is a detailed schematic of the print head.
Figure 3A:
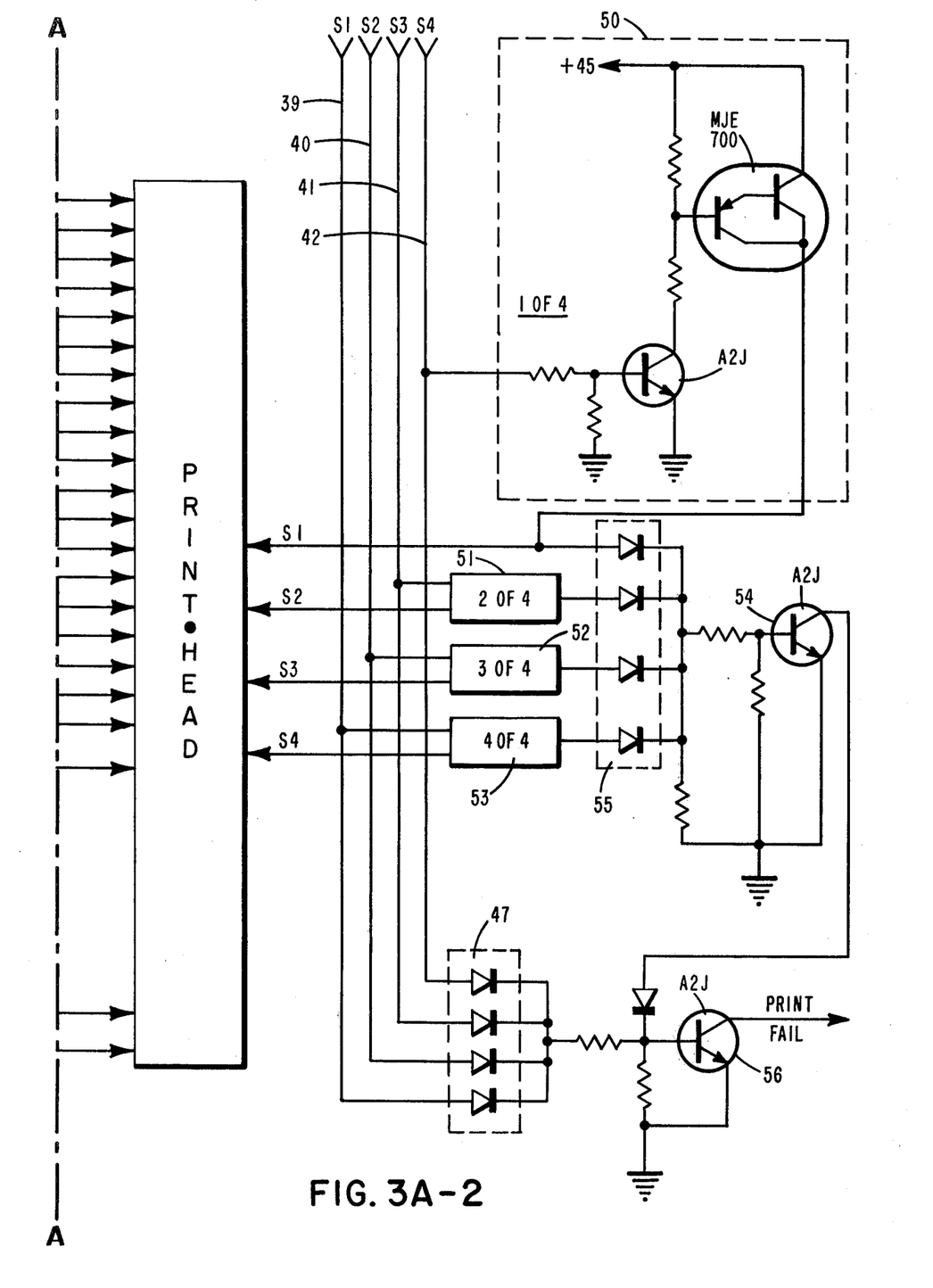
Figure 3B:
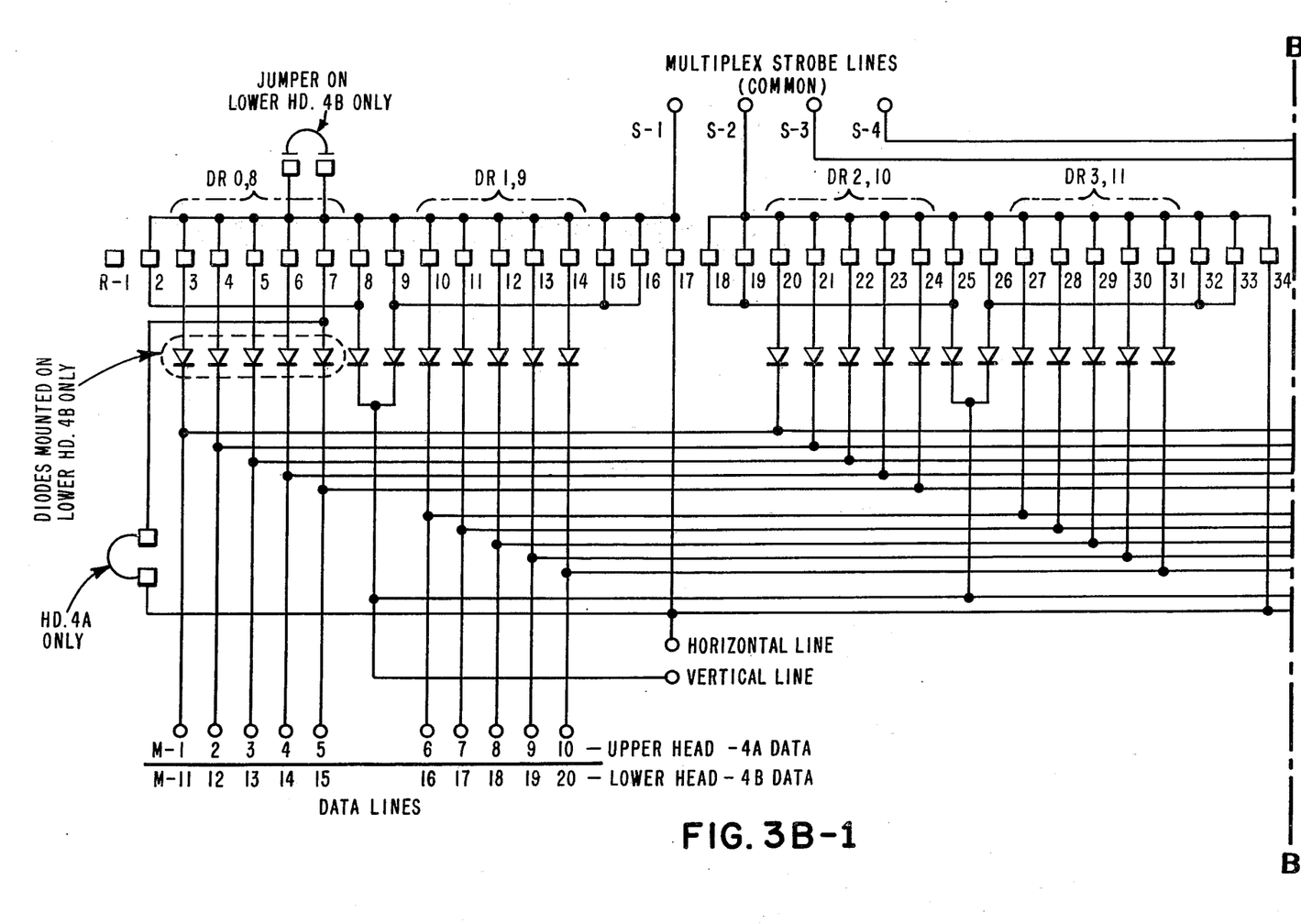
Figure 3B:
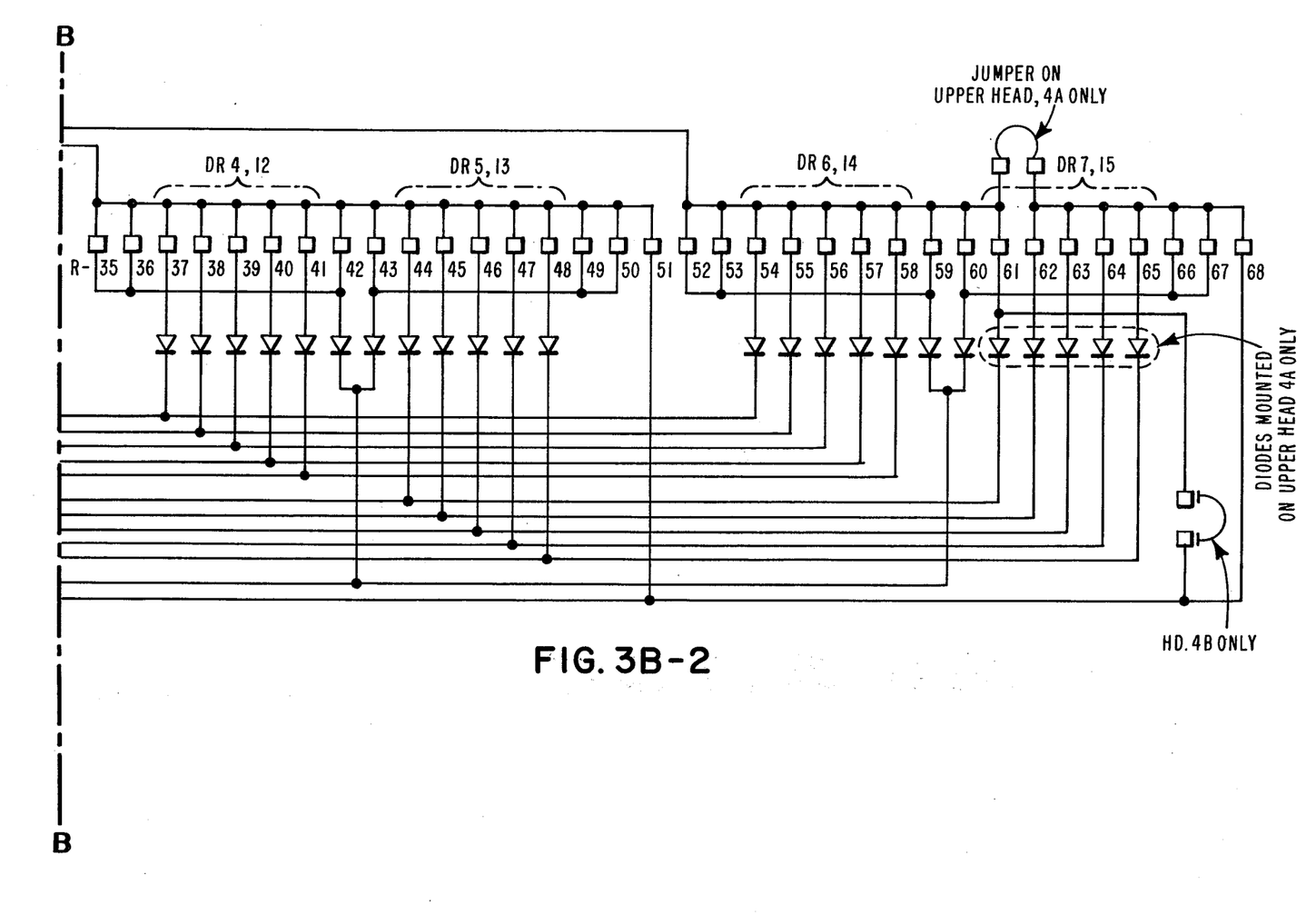

After conversion, the dot sets representing the character segments are transferred via the PIA to the register RG1–RG3 (FIG. 3A) via 5 data lines PB0–PB4 which are connected to each of registers RG1–RG3. Signals appear in succession on control lines E1–E3 to store the dot-representing data signals in registers RG1–RG3. In this manner the data signals for the first three rows of each quadrant (there being four quadrants to each column) are stored. The signals for the character segment defined for the fourth row of the quadrant are not stored in registers; they are applied directly to one side of the print head drive matrix as illustrated in FIG. 3A. The three registers RG1-RG3 each have 5 outputs for a total of 15 outputs connected respectively to print control leads M1-M15. The data lines PB0-PB4 are also directly connected to control leads M16-M20, a fourth subgroup of the dot print leads. In this way a quadrant including dot segments for 4 rows is prepared for printing, the registers RG1-RG3 and data lines PB0-PB4 providing the resistor selection signals to one side of the print matrix (FIG. 3B) on inputs M1-M20. It can be seen from FIG. 3B, the detailed schematic diagram of one of the two print head portions 4A, 4B that each print control lead M1-M20 runs to four dot print elements. For example, control lead M6 runs to dot elements R10, R27, R44, R61. Which of these four dot elements is to be energized while a given data bit is present is determined by phase drive lines S1-S4. These signals S1-S4 are applied in succession; they are generated in sequence to follow the respective sets of data signals defining quadrants 0, 1, 2, 3 so that the appropriate data which has been stored in registers RG1-RG3 is applied to leads M1-M20 when the respective drive signal appears.

The duration of application of drive signals S1-S4 is fixed by common multi-vibrator 30 (FIG. 1) enabled by a signal coincident with the leading edge of each of signals S1-S4; the one-shot multi-vibrator 30 is used so that timing is provided through the drivers 50,51,52,53 rather than by separate signals from the MPU.

In summary, the dot resistors are selected by the data stored in registers RG1-RG3 by signals E1-E3, and by signals on the lines PB0-PB4 applied directly to the print head. Then signals appear on lines S1-S4, their duration limited to about 5 milliseconds by milti-vibrator 30 during which the dot pattern (see FIG. 3B) is thermally printed on the printer paper.

Diode circuitry D1,D2, D3, D4, shown on the right hand side of FIG. 3A provides means for detecting the absence of a voltage drop across the phase driver transistors whenever these drivers are driven into cut-off. A printer-fail signal is generated for transmission back to the PIA 16 if these drivers are found to be shorted out; this signal is used to shut off the printer in order to protect the print heads.

To consider FIG. 3B in detail, it illustrates the relationship between the 16 rows DR0-DR15 into which data is divided for purposes of transfer to the print head, and the actual printing resistors of the thermal dot print elements. The figure shows the print head section 4A; print head section 4B is of like construction, with the only difference being clearly marked on FIG. 3B. Print head 4A includes 67 thick film resistors R1-R68 on a common substrate. The resistors to be energized to print each column of dots are selected by the data lines M1-M20; the timing of the print cycle is provided by strobe lines S1-S4. Basically, a resistor is energized to print a dot only when a signal is received both on a data line (M1-M20) and a strobe line (S1-S4). It is apparent, e.g., that lines M1-M10 control the printing of *rows* DR1-DR7, with the specific *quadrant* in which printing is to occur being selected by successive phase drive signals S1-S4. The selection and energization processes were explained fully above with respect to FIG. 3A, on which these lines also appear.

Comparing the diode matrix of FIG. 3B to the printout of FIG. 2A, no data is ever printed in lines DR0 and DR15. Therefore no diodes are connected to the topmost resistors R1-R7 of the upper head 4A which would be used to print row DR0; and no diodes are connected to the resistors corresponding to R61-R68 on lower head 4B, which would be allocated to row DR15. Connections do exist to element R7 on head portion 4A, and element R61 on head 4B as these are used to print horizontal lines of the background grid.

The allocation of printing resistors R1-R68 to printing of specific character rows DR1-14 appears from a comparison of FIG. 3B with FIG. 2B which show character height and spacing in each frame.

FIG. 2B shows that each frame has the following vertical array:
a solid horizontal line, 1 dot in height;
a 2 dot space;
a character 5 dots in height;
a 2 dot space;
a character 5 dots in height;
a 2 dot space;
a 1 dot horizontal line.

The frame of FIG. 2B could be printed in rows DR2 and DR3 of a frame score printout (FIG. 2A) using the following resistors:
solid horizontal line — R17
2 dot space — R18, 19
5 dot character — R20...24
2 dot space — R25, 26
5 dot character — R27,...31
2 dot space — R32, 33
solid horizontal line — R34

The wiring connections of significance in printing the game score background grid for these exemplary rows DR2, DR3, are the connection of resistors R34 between strobe line S2 and H-LINE signal input and the connection of resistors R17 and R7 between strobe line S1 and the H-LINE signal input to energize these resistors with *every* frame count signal (explained below) to print appropriate portions of horizontal lines of the background grid; and the connection (again taking only print rows DR2 and DR3 for an example) of resistors R18, R19, R25, R26, R32, R33 between the V-LINE signal input and common strobe S2 so that a continuous vertical line of the background grid including those dots never used to print character data can be printed. Of course, to print the solid vertical line, in addition to energizing the special V-LINE input, all the data lines M1-M20 and each of the strobe lines S1-S4 are energized to print the complete vertical line.

As to timing the printing of the background grid, the basic frame clock signal rate which is used to count the width of the frame is applied to the H-LINE wire to serve as that signal. For the vertical line, a simple counter to count to 24 (the width of each of the frames 1-9) or 31 (for frame 10 and the TOTAL and HDCP columns) or 115 (for the name column) provides the necessary V-LINE output signals. A repetitive count of 7 comprised of 5 counts for each character (letter or number, both being printed in a 5-by-5 matrix) and 2 counts for the space preceding each character, provides the basic character space count. This basic count is multiplied by 3 for frames 1-9; by 4 for frame 10, and the TOTAL and HDCP columns; and by 16 for the name column. After the necessary character spaces for a column width are counted, 2 counts are added for spacing after the final character space, and one final count is added, being the horizontal line count pulse, causing transmission of the H-LINE signal. Such a counter is well within the still of the art and is not pictured in detailed here.

The major timing limitation with respect to the energization of each dot element R1–R68 is that when a dot has been fired, the signal must remain applied for five milliseconds in order to heat the thermal paper. This is accomplished by strobe lines S1–S4 which time the energization of each dot print resistor after selection by the data lines. One shot multi-vibrator 30 provides the five-millisecond timing pulse. The paper advance 6 is simply a strobe signal applied through an amplifier to the solenoid 6S of stepping motor 6M in timed relationship to the printing of each column of dots.

The PRINT FAIL signal is developed as follows:

The outputs 35–38 of the drivers 50–53 are applied to an A2J transistor inverter 54 via diode OR-gate 55. These outputs are normally low, i.e., they track the state of the input signals S1–S4 on lines 39–42. The output of the inverter 54 is therefore normally high, holding A2J inverter 56 low and preventing a print fail signal. If a transistor in any driver section 50–53 fails or shorts out, the output of that section will go high, forcing the output of inverter 54 low and allowing the output of inverter 56 to go high, resulting in a PRINT-FAIL signal.

Of course, at timely intervals lines 35–38 must go momentarily high with each print drive signal S1–S4 being carried to the print head. However, these high outputs correspond to high signals S1–S4 incoming on lines 39–42. These incoming signals are carried to inverter 56 via diode OR-gate 47, holding the output of inverter 56 low for the duration of the print drive pulse, and preventing a spurious PRINT-FAIL signal.

The 4-quadrant print cycle is conducted with the paper at rest to avoid "wavy" lines in the output. However, paper motion can be and is initiated while the last quadrant is being printed, in order to increase print speed. This is possible for the following reasons.

The paper motion cycle can be broken down into three phases: (1) solenoid actuation; (2) acceleration; and, (3) decelerction. Phase 1 takes place before acceleration, and requires about 7 milliseconds; this time is required to transfer energy into the solenoid through the rather large inductance in the coil. Once acceleration begins, speed increases to a peak, and then deceleration takes over. The combined acceleration-deceleration phases require an additional 7 milliseconds.

Quadrants are printed in the order 0,1,2,3; each quadrant requires 5 milliseconds to print. Therefore, 3 milliseconds into quadrant 2, the paper advance strobe can be issued. Then, paper motion will not actually being until quadrant 3 signals have produced a print in the paper and terminated.

Therefore, after quadrant 3 is printed, the software counts out a 7 millisecond period to allow completion of the acceleration-deceleration phases.

The 7 milliseconds' wait will be used to prepare the next 14 characters, i.e., 1 character per row, for printing the next column of the score card. The data characters to be printed on the next printout column are fetched from RAM 10 when this print pause is running, and after conversion the print sequence proceeds with printing this next printout column. At the completion of printing, the complete 5-by-5 matrix which will establish a complete character for each row where printing should occur, then the paper again moves past 2 dot spaces; if the frame is completed, all of the resistors not used to print the 5-by-5 data matrices on horizontal line are energized by a signal on a separate line V-LINE; simultaneously, signals are sent to leads M1–M20 and H.LINE. In this manner, the vertical line of the scoring grid is formed on the paper. Breaking down of the characters into rows of 5-by-5 word matrices and printing of both characters and grid lines in this dot-type fashion allows high-speed printing of all the game score data for all the players on a team participating in a game.

The result is a fast, readable, and accurate printout of game score data at any desired time in the course of a game.

I claim:

1. A printer for a bowling game scoring computer for simultaneously printing the game score history of a plurality of bowlers comprising
    a linear array of dot print elements;
    means for storing ball-by-ball, frame, and game score data characters for said plurality of players;
    means for converting one of said stored characters for each of said players whose history is to be printed to data having a dot display compatible format;
    means for transferring a columnar portion of said data representing each of said converted characters for each player whose score history is being printed as selective enabling signals to said print elements; and
    pulse means for energizing ones of said plurality of print elements selected by said transferred data whereby a representation of the converted characters of said player's game score is printed on a column-by-column basis;
    said pulse means further energizing selected ones of said print elements to print simultaneously a rectangular background grid for said game score comprising horizontal and vertical interlaced lines.

2. A printer as claimed in claim 1 further including a clock pulse source for controlling the transfer of said columnar portions of characters by said transferring means, and means for printing a rectangular background grid for said frame score data including means included in said transferring means for simultaneously energizing every one of said elements of said linear array to print a vertical line of said grid;
    and means directly responsive to said clock pulse source for energizing selected ones of said linear array of print elements with every operation of said pulse means to print horizontal lines of said grid.

3. A printer as claimed in claim 2 including
    thermally responsive paper as a recording medium,
    said print elements comprising resistors for selectively forming dots on said recording medium.

4. A printer as claimed in claim 3 wherein said transferring means includes register means for storing said converted data, and
    first signal means for gating said converted data into said register means to form said enabling signals for said print elements.

5. A printer as claimed in claim 4 wherein said pulse means comprises a monostable multi-vibrator having a period shorter than the storage time for said dot format data stored by said register means.

6. A printer as claimed in claim 1 wherein said linear array of print elements is divided into a plurality of sectors, said transferring means includes a register means including plural registers for storing said converted data, each register of said register means having an input connected to said storing means, and a plurality of outputs, each of said outputs connected to a print element in each of a plurality of said sectors.

7. A printer as claimed in claim 6 wherein each of said sectors includes a sufficient number of said print elements to print the game score of one of said players.

8. A printer as claimed in claim 7 wherein each of said sectors further comprises a sufficient number of print elements to print background grid lines for the player's game score printed by said sector's elements.

9. A printer as claimed in claim 8 further including a clock pulse source for controlling the transfer of said columnar portions of characters by said transferring means, and means for printing a rectangular background grid for said frame score data including means included in said transferring means for simultaneously energizing every one of said elements of said linear array to print a vertical line of said grid;

and means directly responsive to said clock pulse source for energizing selected ones of said linear array of print elements with every operation of said pulse means to print horizontal lines of said grid.

10. A printer as claimed in claim 7 wherein each of said sectors comprises about one-fourth of said print elements in said linear array.

11. A printer as claimed in claim 6 wherein said pulse means comprises a plurality of phase drive lines, one for each of said sectors, for carrying drive pulses to said selected print elements.

12. A printer as claimed in claim 11 wherein each of said sectors includes a sufficient number of said print elements to print the game score of one of said players.

13. A printer as claimed in claim 12 further including a clock pulse source for controlling the transfer of said columnar portions of characters by said transferring means, and means for printing a rectangular background grid for said frame score data including means included in said transferring means for simultaneously energizing every one of said elements of said linear array to print a vertical line of said grid;

and means directly responsive to said clock pulse source for energizing selected ones of said linear array of print elements with every operation of said pulse means to print horizontal lines of said grid.

14. A printer as claimed in claim 11 further comprising print drivers connected between each of said phase drive lines and the print elements energized thereby, each print driver comprising at least one transistor, and means for detecting the failure of any of said print driver transistors comprising a first inverter whose output defines a print fail signal indicating failure of one of said print driver transistors, and having a plurality of inputs including each of said phase drive lines and a second inverter coupled between said print drivers and said first inverter.

15. A bowling computer system including means for storing game scoring data comprising the ball-by-ball frame and total game score history of bowling games for a plurality of bowlers; means for printing said stored data, wherein the improvement comprises said printing means having a linear array of adjacent dot print elements, said array being of sufficient length to print simultaneously the game scoring data for all of said players and a rectangular background grid comprising horizontal and vertical interlaced lines.

16. A system as claimed in claim 15 including a random access memory for storing said score history in binary data character format, means for transmitting the data to said printer comprising means for converting one of said stored data characters for each of said players whose history is to be printed to data having a dot display compatible format;

means for transferring a columnar portion of said data representing each of said converted characters for each player whose score history is being printed as selective enabling signals to said print elements; and pulse means for energizing ones of said plurality of print elements selected by said transferred data whereby a representation of the converted characters of said player's game score is printed on a column-by-column basis by said printing means in alignment with said background grid.

17. A system as claimed in claim 16 further including a clock pulse source for controlling the transfer of said columnar portions of characters by said transferring means, and wherein said means for printing said rectangular background grid for said frame score data including means included in said transferring means for simultaneously energizing every one of said elements of said linear array to print said vertical lines of said grid;

and means directly responsive to said clock pulse source for energizing selected ones of said linear array of print elements with every operation of said pulse means to print said horizontal lines of said grid.

18. A printer as claimed in claim 17 including thermally responsive paper as a recording medium, said print elements comprising resistors for selectively forming dots on said recording medium.

19. A system as claimed in claim 18 wherein said transferring means includes register means for storing said converted data, and first signal means for gating said converted data into said register means to form said enabling signals for said print elements.

20. A system as claimed in claim 19 wherein said pulse means comprises a monostable multi-vibrator having a period shorter than the storage time for said dot format data stored by said register means.

21. A system as claimed in claim 20 wherein said linear array of print elements is divided into a plurality of sectors, said register means having an input connected to said storing means, and a plurality of outputs, each of said outputs connected to a print element in each of a plurality of said sectors.

22. A system as claimed in claim 21 wherein each of said sectors includes a sufficient number of said print elements to print the game score of one of said players.

23. A system as claimed in claim 22 wherein each of said sectors further comprises a sufficient number of print elements to print background grid lines for the player's game score printed by said sector's elements.

24. A system as claimed in claim 22 wherein each of said sectors comprises about one-fourth of said print elements in said linear array.

25. A system as claimed in claim 21 wherein said pulse means comprises a plurality of phase drive lines, one for each of said sectors, for carrying drive pulses to said selected print elements.

26. A system as claimed in claim 25 wherein each of said sectors includes a sufficient number of said print elements to print the game score of one of said players.

27. A system as claimed in claim 21 further comprisng print drivers connected between each of said phase drive lines and the print elements energized thereby, each print driver comprising at least one transistor,
- and means for detecting the failure of any of said print driver transistors comprising
  - a first inverter whose output defines a print fail signal indicating failure of one of said print drive transistors, and having a plurality of inputs including each of said phase drive lines and a second inverter coupled between said print drivers and said first inverter.

28. A system as claimed in claim 17 wherein said transferring means includes register means for storing said converted data, and
- first signal means for gating said converted data into said register means to form said enabling signals for said print elements.

29. A system as claimed in claim 28 wherein said linear array of print elements is divided into a plurality of sectors, said register means having an input connected to said storing means, and a plurality of outputs, each of said outputs connected to a print element in each of a plurality of said sectors.

30. A system as claimed in claim 29 wherein said pulse means comprises a plurality of phase drive lines, one for each of said sectors, for carrying drive pulses to said selected print elements.

31. A system as claimed in claim 30 further comprising print drivers connected between each of said phase drive lines and the print elements energized thereby, each print driver comprising at least one transistor,
- and means for detecting the failure of any of said print driver transistors comprising
  - a first inventor whose output defines a print fail signal indicating failure of one of said print driver transistors, and having a plurality of inputs including each of said phase drive lines and a second inverter coupled between said print drivers and said first inverter.

* * * * *